United States Patent
Kim

(10) Patent No.: US 11,682,072 B2
(45) Date of Patent: Jun. 20, 2023

(54) WORK SUPPORT SYSTEM AND METHOD WITH SCREEN SHARING AND DEVELOPMENT SYSTEM FOR MULTI-PLATFORM APPLICATION

(71) Applicant: Inswave Systems Co., Ltd., Seoul (KR)

(72) Inventor: Wooglae Kim, Seoul (KR)

(73) Assignee: Inswave Systems Co., Ltd., Seoul (KR)

( * ) Notice: Subject to any disclaimer, the term of this patent is extended or adjusted under 35 U.S.C. 154(b) by 0 days.

(21) Appl. No.: 17/585,184

(22) Filed: Jan. 26, 2022

(65) Prior Publication Data
US 2022/0148078 A1 May 12, 2022

Related U.S. Application Data

(63) Continuation-in-part of application No. 17/375,896, filed on Jul. 14, 2021, now Pat. No. 11,270,317.

(30) Foreign Application Priority Data

Jul. 16, 2020 (KR) .................. 10-2020-0088230

(51) Int. Cl.
*G06Q 40/02* (2023.01)
*H04L 9/32* (2006.01)
*G06F 9/451* (2018.01)

(52) U.S. Cl.
CPC ............. *G06Q 40/02* (2013.01); *G06F 9/452* (2018.02); *H04L 9/3213* (2013.01); *H04L 9/3247* (2013.01); *G06Q 2220/00* (2013.01)

(58) Field of Classification Search
CPC ....... G06Q 40/02; G06F 9/452; H04L 9/3213; H04L 9/3247
See application file for complete search history.

(56) References Cited

U.S. PATENT DOCUMENTS

| | | | |
|---|---|---|---|
| 2018/0241930 A1* | 8/2018 | Eisses | G06N 5/022 |
| 2020/0128210 A1* | 4/2020 | Hatada | H04N 7/147 |
| 2021/0326482 A1* | 10/2021 | Sahgal | G06F 40/186 |

* cited by examiner

Primary Examiner — Rasha S Al Aubaidi
(74) Attorney, Agent, or Firm — IP & T Group LLP

(57) ABSTRACT

Work support system and method with screen sharing and development system for multi-platform application disclosed. The work support system with screen sharing includes a customer terminal in which a service application is installed and executed, an employee terminal configured of sharing and displaying a designated area of an execution screen of the service application, and a work support server configured of communicating with the customer terminal and the employee terminal, and supporting a customer work by setting a screen of the customer terminal to be shared in the employee terminal under a specified condition.

2 Claims, 8 Drawing Sheets

WORK SUPPORT SYSTEM AND METHOD WITH SCREEN SHARING AND DEVELOPMENT SYSTEM FOR MULTI-PLATFORM APPLICATION

CROSS-REFERENCE TO RELATED APPLICATION

This application is a continuation in part of U.S. patent application Ser. No. 17/375,896 filed on Jul. 14, 2021, which claims benefits of priority of Korean Patent Application No. 10-2020-0088230 filed on Jul. 16, 2020. The disclosure of each of the foregoing application is incorporated herein by reference in its entirety.

FIELD OF INVENTION

The present invention relates to a work support system and method, and more particularly, to a work support system and method of enabling efficient work performance with screen sharing and a multi-platform application development system.

BACKGROUND

Recently, digital transformation has been in the spotlight. Digital transformation refers to the digital transformation of business operations, including our daily lives, using new digital technologies.

Companies/agencies are changing to using the cloud provided as a service without building a server or operating environment on their own. Using a cloud service means that data or resources exist in an external cloud.

This is bringing about a change to a new way of working, such as cooperation and sharing through mobile devices such as smartphones, and the need for work programs that can support collaboration and sharing to adapt the change is rapidly increasing.

Currently, the market is divided into platforms for mobile app development and desktop application platforms. In the mobile ecosystem, the emergence of incompatible mobile operating systems such as Apple's iOS and Google's Android has increased the burden of developing application for specific operating systems, a hybrid app that can easily develop a single app that can be efficiently performed on various platforms such as iOS, Android, and Windows with one development have begun to gain attention.

However, cloud-based development/operation tools that can support mobile and desktop integration have not yet been commercialized.

OBJECTIVES OF INVENTION

This invention is intended to provide a work support system and method with screen sharing that improves work efficiency by sharing terminal screens between service users and providers to enable faster and more accurate work processing.

This invention is also intended to provide a multi-platform application development system that supports the development of applications that enable work support with screen sharing for terminals having various platforms.

Other objectives and advantages will be easily understood from the following description.

SUMMARY OF INVENTION

According to one aspect of the present invention, a work support system with screen sharing, including a customer terminal in which a service application is installed and executed, an employee terminal configured of sharing and displaying a designated area of an execution screen of the service application, and a work support server configured of communicating with the customer terminal and the employee terminal, and supporting a customer work by setting a screen of the customer terminal to be shared in the employee terminal under a specified condition, is provided.

In the employee terminal, a work area for processing work may be additionally displayed in addition to a shared screen on which the screen of the customer terminal is mirrored.

When a signature area is selected in the employee terminal during the work processing, a signature input window for receiving the customer's handwritten signature is additionally displayed on the screen of the customer terminal, and the handwritten signature input through the signature input window is transmitted to the employee terminal to generate a real-time signed electronic document The work support server may generate a token in response to a token generation request for work sharing from the customer terminal, transmit the token to the customer terminal, determine whether the token extracted from an identification code included in the sharing request is identical to the token transmitted to the customer terminal, and allow a screen sharing if the two tokens are identical. The customer terminal may generate the identification code including the token and an access information to the work support server and outputs the identification code on screen, and the employee terminal may capture the identification code, and generate the sharing request including the identification code and information of an employee who operates the employee terminal.

The work support server is included in an execution architecture, and may include a work sharing server configured of managing access information of an application user and providing a link function between the work support server and the service applications executed in the customer terminal and the employee terminal.

Other aspects, features, and advantages will be more apparent from accompanying drawings, claims and detailed description.

Effects of Invention

According to an embodiment of the present invention, there is an effect of improving work efficiency by sharing a terminal screen between a service user and a service provider to enable faster and more accurate work processing.

In addition, there is an effect of supporting the development of applications that enable work support with screen sharing for terminals having various platforms.

BRIEF DESCRIPTION OF ACCOMPANYING DRAWINGS

Figure 3:
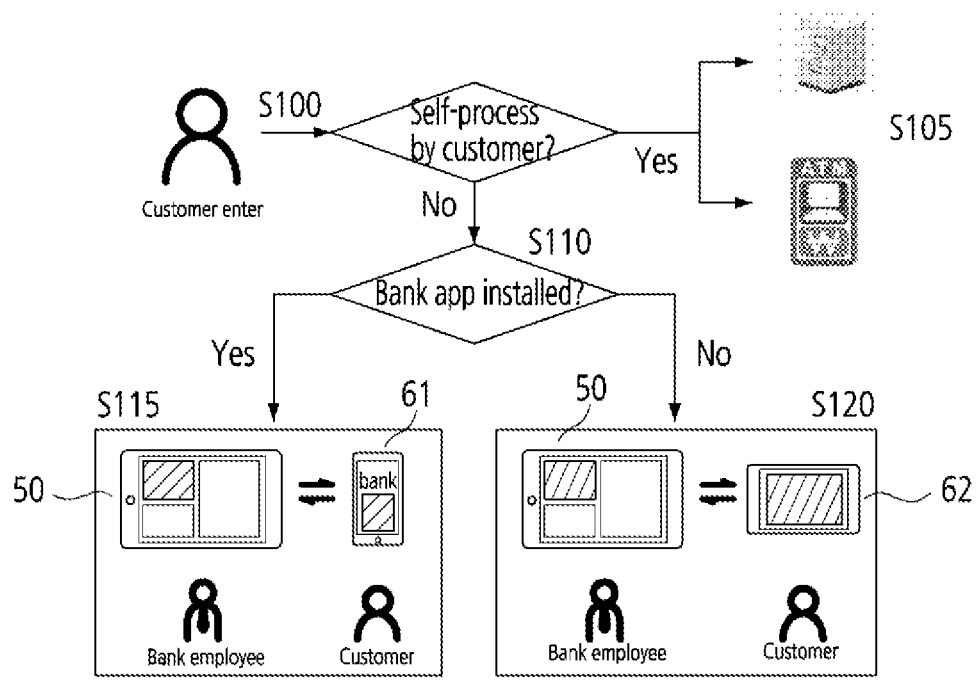
Figure 4:
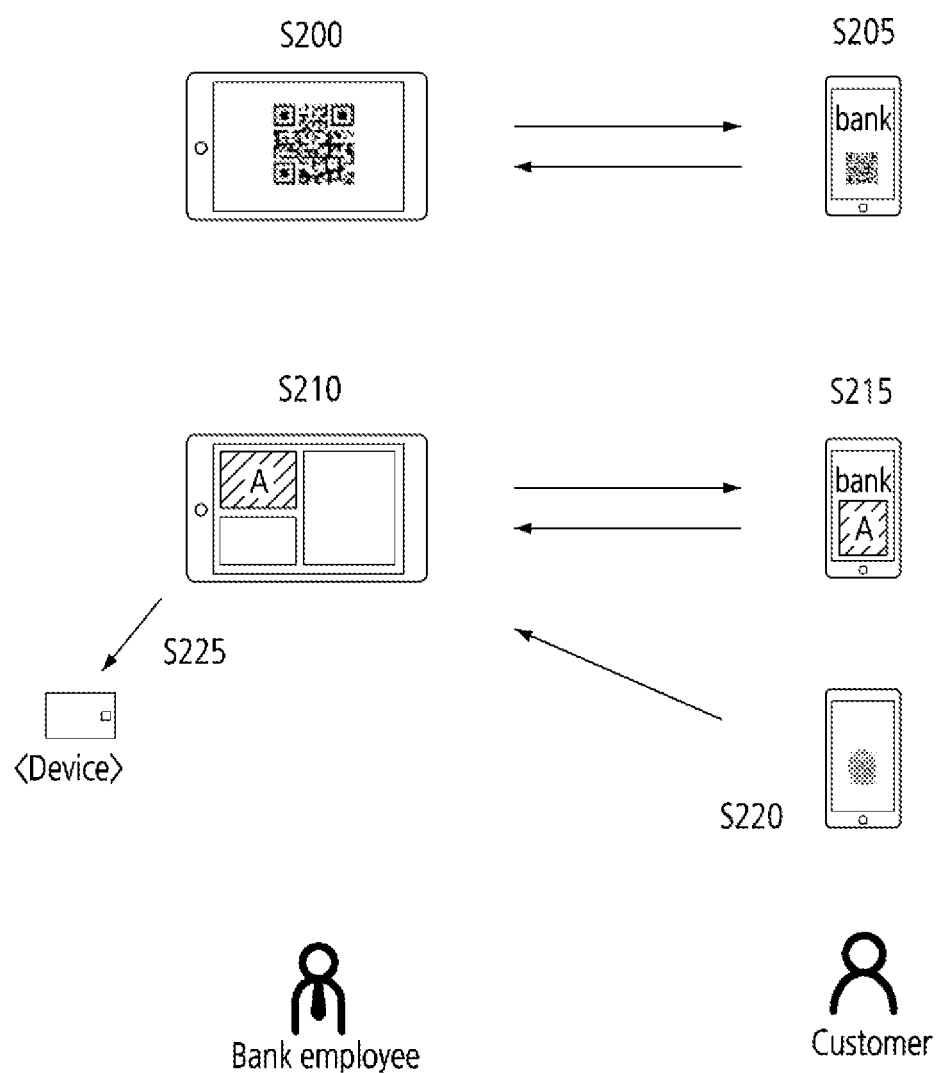
Figure 5:
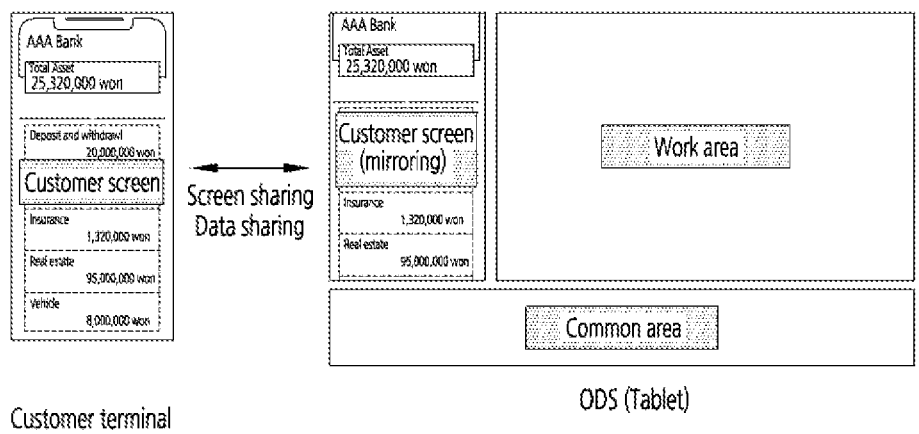
Figure 6:
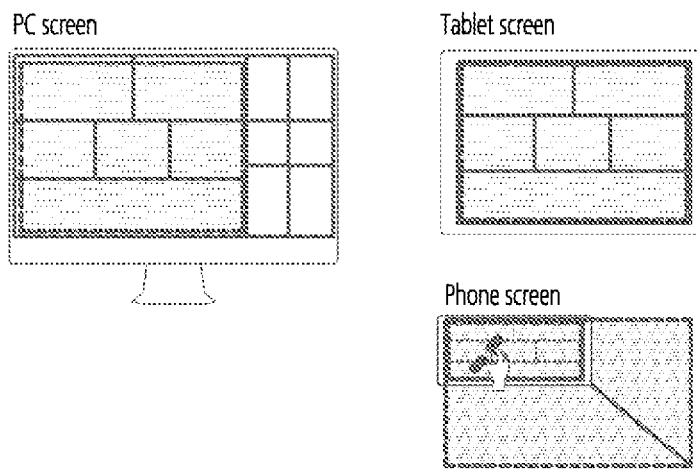
Figure 7:
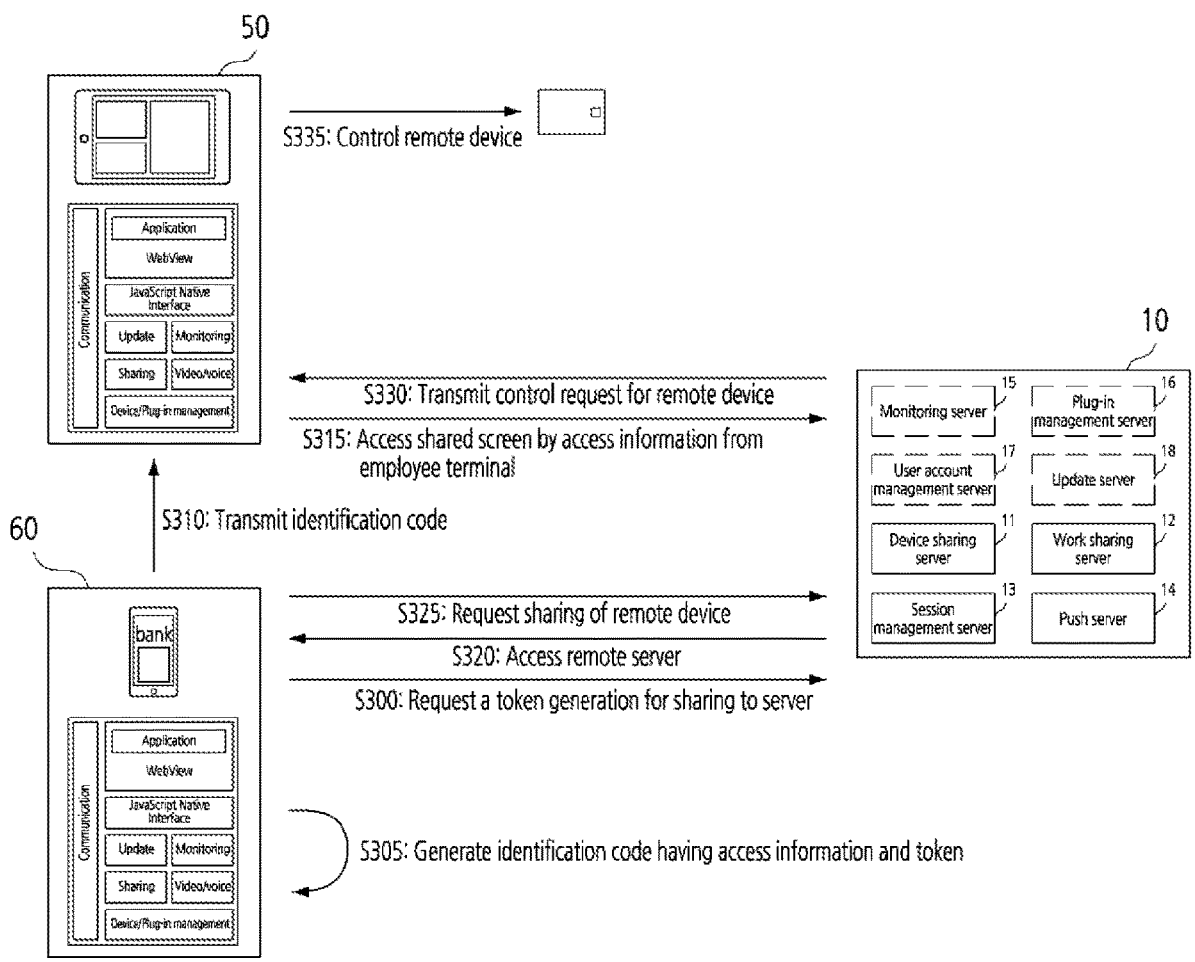
Figure 8:
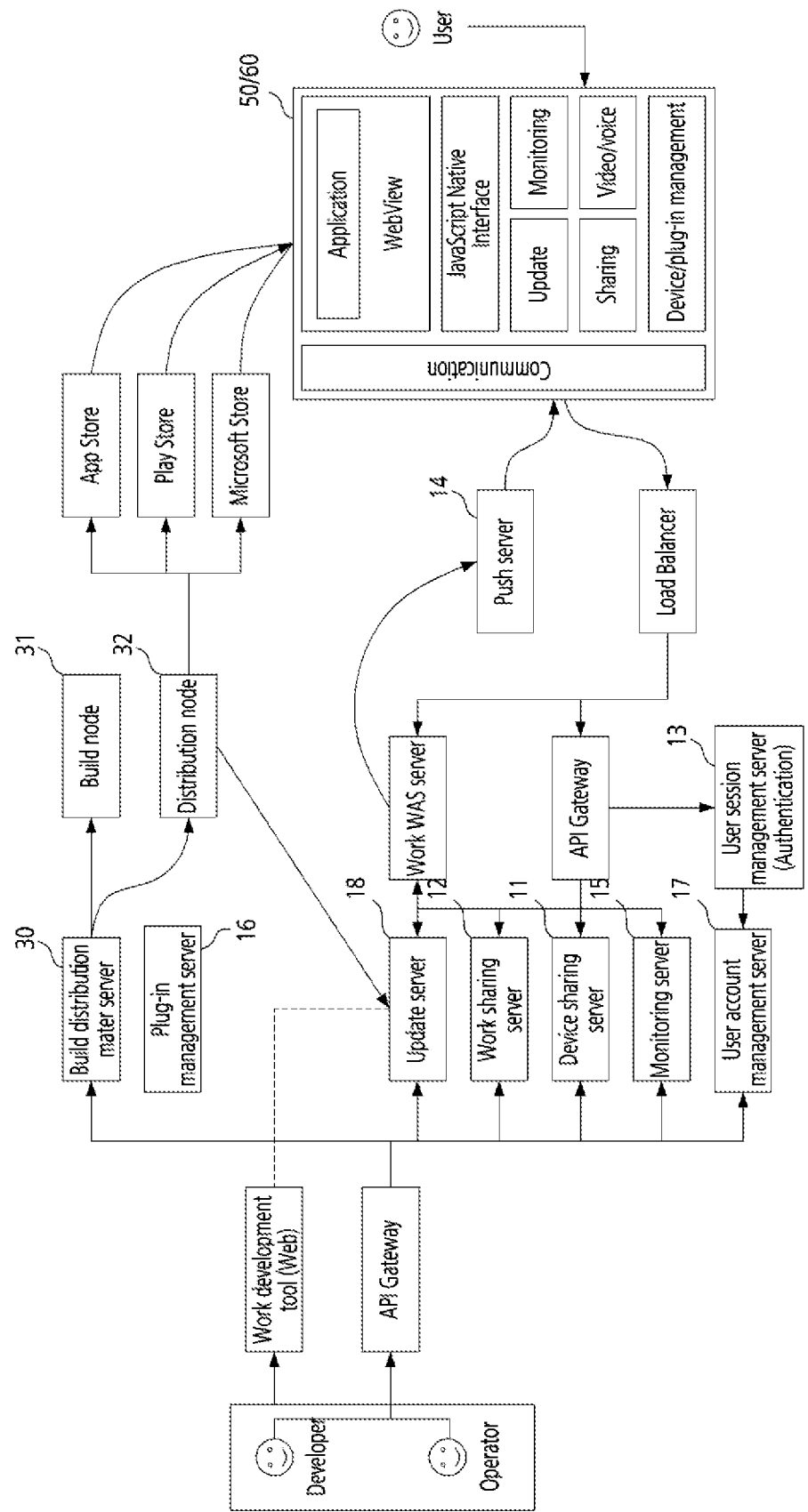
Figure 9:
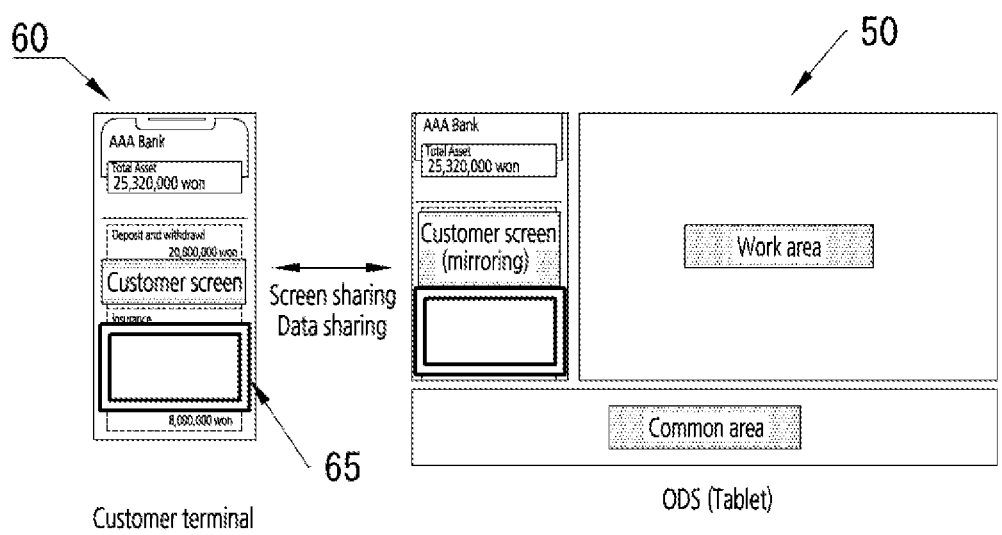

FIG. 3 and FIG. 4 exemplarily illustrate a work support process with screen sharing according to one embodiment of the present invention;

FIG. 5 exemplarily illustrates a work screen sharing between a customer terminal and an employee terminal;

FIG. 6 exemplarily illustrates screen views;

FIG. 7 exemplarily illustrates a procedure of a screen sharing process for work support;

FIG. 8 exemplarily illustrates an architecture of a multi-platform application development system according to another embodiment of the present invention; and FIG. 9 exemplarily illustrates input of a customer's handwritten signature during screen sharing.

DETAILED DESCRIPTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Figure 1:
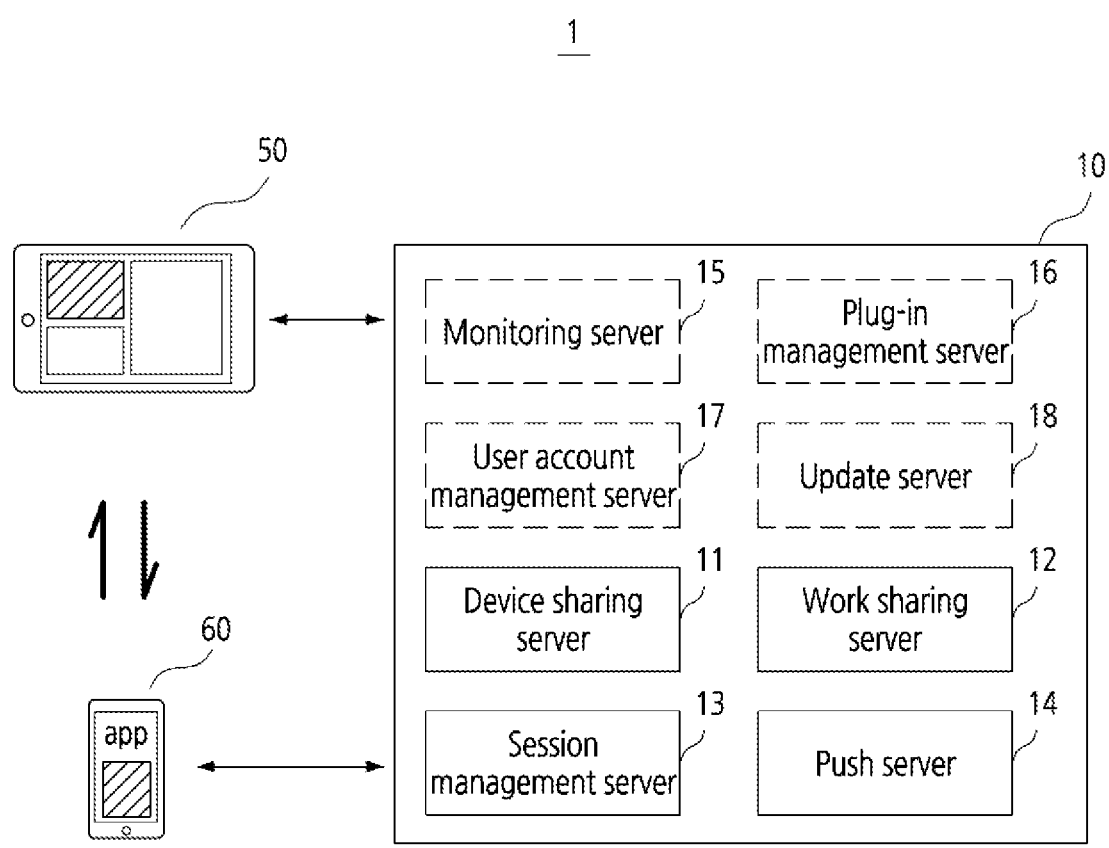
FIG. 1 is a schematic diagram of a work support system with screen sharing according to one embodiment of the present invention.
Figure 2:
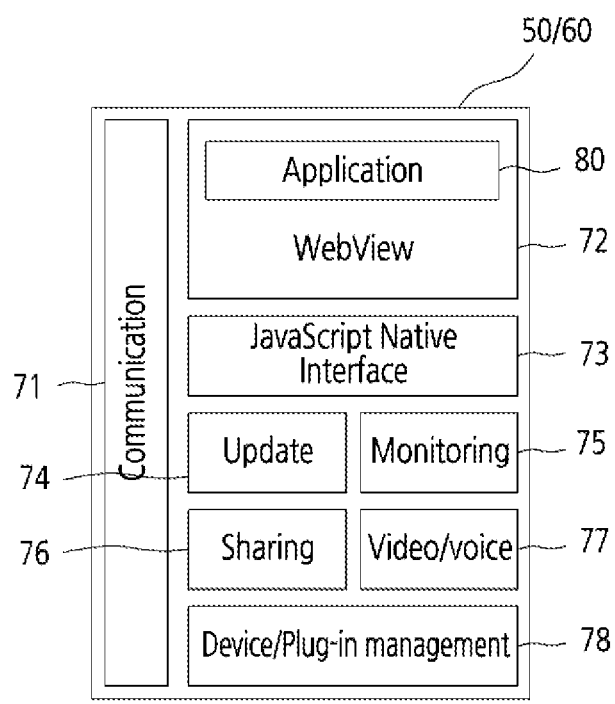
FIG. 2 is a schematic diagram of a client side (work support terminal) included in the work support system with screen sharing according to one embodiment of the present invention.

Terms such as ~part, ~unit, ~module mean an element configured for performing a function or an operation. This can be implemented in hardware, software or combination thereof. FIG. 1 is a schematic diagram of a work support system with screen sharing according to one embodiment of the present invention, and FIG. 2 is a schematic diagram of a client side (work support terminal) included in the work support system with screen sharing according to one embodiment of the present invention.

The work support system and method with screen sharing according to one embodiment of the present invention are characterized by allowing a service provider (employee) who provides a specific service to share a user (customer) of the service or other employee's terminal screen, thereby enabling more efficient and faster work processing of the service.

Referring to FIG. 1, the work support system 1 with screen sharing according to one embodiment may include a work support server 10, a customer terminal 60, and an employee terminal 50. The work support server 10, the customer terminal 60, and the employee terminal 50 may be connected through a wired/wireless network.

The employee terminal 50 is a terminal device operated by an employee who is a service provider providing a specific service. It may be a computing device such as a smartphone, a tablet PC, a notebook computer, a desktop PC, or the like, in which a work support-related application or program (hereinafter collectively referred to as an application) is loaded or installed through download and an operating system capable of executing the application is installed.

The customer terminal 60 is a terminal device owned or operated by a customer who is a user who is provided with a specific service. The customer terminal 60 is also a computing device equipped with an operating system that can be installed through a download or can be installed through a work support application according to the present embodiment, and execute the application, for example, a smartphone, a tablet PC, a notebook computer, a desktop PC, or the like.

The work support server 10 is a server device that communicates with the customer terminal 60 and the employee terminal 50, and transmits all or part of the screen displayed on the customer terminal 60 to the employee terminal 50 to enable screen sharing to and possible to smoothly provide the service.

The work support server 10 may include a device sharing server 11, a work sharing server 12, a session management server 13, and a push server 14, all included in an execution architecture. Additionally, it may further include one or more of a monitoring server 15, a plug-in management server 16, a user account management server 17, and an update server 18, all included in an operation architecture.

The device sharing server 11 manages a device list and status connected to the terminal (in particular, the employee terminal 50). And the device sharing server 11 shares so that the other terminals (e.g., the customer terminal 60 or the other employee terminal 50) can access and use the device included in the device list.

The work sharing server 12 manages access information of application users (customers, employees, etc.). In addition, the work sharing server 12 provides a link function between the server and the application for sharing screens and/or data between users.

The session management server 13 manages authorization and authentication for the application user to access an AP (access point) gateway.

The push server 14 transmits messages such as various announcements and news to the application.

The monitoring server 15 monitors and collects the status of the terminal (employee terminal 50, customer terminal 60) in which the application is running. The monitoring server 15 may respond to a failure by analyzing the collected data, and may provide information on the terminal status according to a request.

The plug-in management server 16 registers and manages plug-ins associated with the application. The plug-in management server 16 may provide necessary plug-in information in conjunction with the build process.

The user account management server 17 manages accounts of application users (customers, employees, etc.).

The update server 18 provides a function of distributing and installing applications, plug-ins, or related files.

Referring to FIG. 2, it is a schematic diagram of the terminal (customer terminal 60 or employee terminal 50) in which an application is loaded or installed after downloading.

The terminal 50/60 may include a communication module 71, a web view module 72, an interface module 73, an update module 74, a monitoring module 75, a sharing module 76, and a video/voice module 77, a device/plug-in management module 78.

The communication module 71 communicates with the work support server 10 to transmit and receive various data and files. The communication module 71 may include a mobile communication device such as 3G, 4G, or 5G and/or a short-range communication device such as Bluetooth or Wi-Fi. Data and files transmitted and received through the communication module 71 are encrypted through an encryption module (not shown), so that hacking can be prevented.

The web view module 72 displays a screen according to the execution of the application 80.

The interface module 73 may be a native interface, for example, a JavaScript native interface.

The update module 74 receives files distributed by the update server 18 through the communication module 71 and updates the application, plug-in, or related module.

The monitoring module 75 collects various data and logs about the terminal status when the application is executed, and transmits it to the monitoring server 15 through the communication module 71.

The video/voice module 77 supports a video call or a voice call between an employee and a customer to enable a non-face-to-face service when a service is provided. In case of a voice call, the video/voice module 77 may include a microphone and a speaker, and in the case of a video call, the video/voice module 77 may further include a camera.

The device/plug-in management module 78 manages devices and plug-ins associated with the application.

The sharing module 76 provides a work sharing function. Work sharing may include screen sharing and/or data sharing. In addition, the sharing module 76 may also provide a device sharing function.

The work sharing function, particularly, the screen sharing function shares all or part of the screen of the customer terminal 60 to be displayed in a designated area of the employee terminal 50 when interconnections for work support are established between a plurality of terminals desiring to be interconnected in a predetermined method, thereby enabling the employee to smoothly perform work or help the customer without directly handling the customer terminal 60.

The device sharing function may allow a device (e.g., a printer, an card printer, etc.) connected to a specific employee terminal 50 to be accessed from another terminal (customer terminal 60 or other employee terminal 50) that is not directly connected to the device to perform work (printing out, card issuance, etc.) through the device.

The work support system and method with screen sharing according to one embodiment may be utilized as follows.

In the digital environment of the financial sector based on the digital transformation, financial sales staff can collaborate and share tasks such as electronic signatures, financial product design, and payment requests between customers and employees in environments such as ODS (Out Door Sales) and mobile branch regardless of device types. It can also be used for digital kiosks linked to biometric authentication systems without a bankbook or a card.

When building a warship combat system where security is essential in the defense field, it enables access and control of various hardware such as weapons and sensors, supports high-level security requirements, and supports offline operation to ensure normal operation in case of network disconnection.

In the field of e-learning, it is possible to enable the interaction between the teacher and the student to provide an e-learning service by sharing the teacher's teaching and course contents with the remote student's terminal. By sharing the electronic blackboard and the terminals of students, collaborative classes through two-way communication are possible, and interactive collaborative classes between teachers and students can be made by using the push function.

As a public service for the public, it is possible to share a kiosk for self-authentication when entering/exiting an airport/port, an unmanned certificate issuing machine, and so on with the customer's terminal environment, and the governmental agencies' face-to-face/non-face-to-face sharing services become possible.

In the digital twin-based manufacturing environment, the dynamic simulation of physical objects and systems can be digitized with a focus on the manufacturing field, and the user terminal environment for the simulation of the design, operation, and maintenance of production facilities, and virtualization training of field workers can be performed through collaboration and sharing.

In the digital medical field, it can be used to build a telemedicine system that supports real-time sharing of biometric information collected through IoT devices, and interworking with medical devices and EMR (Electronic Medical Record) systems can be used.

In the collaborative software development environment, shared development tools that enable knowledge sharing and real-time code review in collaboration, co-ownership, and horizontal relationships can be supported.

Hereinafter, a work support method performed in the work support system with screen sharing according to one embodiment will be described with reference to accompanying drawings. For the convenience of understanding and explanation of the present invention, it is assumed that the present invention is applied to ODS in the financial sector.

FIGS. 3 and 4 exemplarily illustrate a work support process with screen sharing according to one embodiment of the present invention, FIG. 5 exemplarily illustrates a work screen sharing between a customer terminal and an employee terminal, and FIG. 6 exemplarily illustrates screen views, and FIG. 9 exemplarily illustrates input of a customer's handwritten signature during screen sharing.

A customer service procedure in a smart branch is shown in FIG. 3.

In S100, when the customer visits the branch, it is determined whether the work will be handled face-to-face or by himself.

In S105, in case of customer self-processing, the customer can process by her/himself works that are used to be done at the teller window such as deposit/withdrawal/remittance at ATM (Automated Teller Machine), or new/reissued card, OTP issuance, bankbook reissuance, password change and so on at STM (Smart Teller Machine, Self Teller Machine).

In S110, in case that the customer wants to process face-to-face with the employee, it is determined whether the bank application is installed in the first customer terminal 61 (mobile phone, smart phone).

In S115, if the bank application is installed, the employee terminal 50 and the first customer terminal 61 can be linked to process work through screen/data sharing.

In S120, if the bank application is not installed, the work can be processed by linking the second customer terminal 62 (a tablet or PC owned by the bank, provided for the customer to use) and the employee terminal 50 provided at the window.

The first customer terminal 61 and the second customer terminal 62 are terminals in which the bank application is installed, and the former is owned by the customer and the latter is owned by the bank, but there is something in common that both are operated by the customer in processing bank work.

Referring to FIG. 4, in S115, a procedure of processing works in association between the employee terminal 50 and the first customer terminal 61 will be described in more detail.

In S200, in order to identify the terminal that wants to share the screen and establish the interconnection, first, an identification code (e.g., QR code) is generated and displayed in the employee terminal 50.

In S205, in the first customer terminal 61, by taking the identification code displayed on the employee terminal 50 using a camera, information about the employee terminal 50 to be shared is extracted, and the interconnection between the employee terminal 50 and the first customer 61 may be established to start sharing.

Although it has been described assuming that the generation of the identification code is made in the employee terminal 50, but this is only one embodiment. It should be understood that the identification code may be generated in the first customer terminal 61 and captured by the employee terminal 50 to establish the interconnection.

That is, when there are two terminals that wish to establish the interconnection, the identification code may be generated in any one of two terminals, and the other terminal may capture the generated identification code and extract information about the terminal that generated the identification code to establish the interconnection for sharing (screen and/or data) between the two terminals.

In S210, when the interconnection is established, a required work screen among the screens of the shared first customer terminal 61 is shared. The work screen sharing may be performed for whole area or a predetermined portion of area (screen area A) of the application execution screen of the first customer terminal 61.

In the employee terminal 50, a shared screen may be displayed at a predetermined location. In FIG. 4, the shared screen (customer screen) may be displayed in area A, and contents (work area, common area) corresponding to the shared screen for smooth work processing may be displayed in areas B and C.

Referring to FIG. 5, a case in which the work screen is shared between the first customer terminal 61 and the employee terminal 50 is illustrated. In the predetermined area A of the employee terminal 50, the customer screen may be mirrored and displayed.

In S215, the first customer terminal 61 may receive customer input by outputting items requiring customer input through the shared screen. In this case, it is possible to minimize customer input items so as not to cause customer inconvenience.

Customer's signature may be required during work processing through screen sharing. In this case, referring to FIG. 9, when a signature area requiring the client's signature is selected from among the screens shared by the employee terminal 50, the first customer terminal 61 functioning as a viewer displays a signature input window 65 as a separate pop-up window to enable for the client to input a handwritten signature.

In this case, although it is temporary, an UI (user interface) that allows the content (whole electronic document requiring customer's signature) displayed on the screen of the employee terminal 50 (in particular, the designated area A) (the entire electronic document requiring a customer signature) and the content displayed on the first customer terminal 61 (signature input window) to be different may be applied. After the customer's handwritten signature is completed, the employee terminal 50 and the first customer terminal 61 may be switched to share the same screen.

The first customer terminal 61 may receive the customer's handwritten signature electronically in the signature input window 65 through a stylus pen. The customer's handwritten signature input in the signature input window 65 may be electronically processed and transmitted to the employee terminal 50. In the employee terminal 50, by attaching the customer's handwritten signature to the electronic document related to the current work, real-time signature of the electronic document can be made.

Depending on the customer input, depository works such as card issuance, OTP issuance, bio information registration and credit works such as electronic signature for loan application can be processed.

In S220, it is also possible to register a bio-authentication medium using a fingerprint, iris and so on through the bank application installed in the first customer terminal 61, and then use it as an identity verification means in an ATM (or STM) device. In this case, the first customer terminal 61 transmits only the authentication result rather than the bio-authentication information as it is, so that sensitive personal information can be protected.

In S225, by connecting a bank device such as a card issuer, a card-type OTP issuer, a printer and so on commonly used in the branch with the employee terminal 50, it becomes possible to process works that were previously processed at the teller window.

In one embodiment, screen sharing is performed between two different devices for work support. In this case, the two devices may have displays having different specifications.

Accordingly, a screen view in One Source Multi Use (OSMU) method that can enlarge or reduce the same screen to match the resolution of various devices including smartphones, tablets, and PCs may be applied.

Referring to FIG. 6, it is possible to display the same customer screen on PC and tablet or smartphone by enlarging or reducing the shared screen at a certain ratio.

As shown in FIG. 5, in case that the employee terminal 50 shares the customer screen, the screen view may be applied to the work area, so that screen scrolling due to mirroring of the customer screen can be minimized. For example, when the size of a display device for displaying content decreases, horizontal scrolling and vertical scrolling may occur simultaneously. In such a situation, needs for scrolling can be minimized through the screen view function that changes the screen size so that horizontal scrolling does not occur.

FIG. 7 exemplarily illustrates a procedure of a screen sharing process for work support.

In FIG. 7, a case in which the identification code is generated by the first customer terminal 61 is illustrated.

In S300, when the bank application is executed and a share request is input from the customer, the first customer terminal 61 requests the creation of a token for work sharing to the work support server 10. The work support server 10, particularly the work sharing server 12, generates and provides the token for identifying the terminal according to the request from the terminal.

In S305, the first customer terminal 61 generates the identification code including the token included in the response received in response to the token generation request and access information (encrypted URL information including authentication information). The identification code may be, for example, QR code.

In S310, the generated identification code is transmitted to the employee terminal 50 that needs sharing. As one example of delivering the identification code, a method of acquiring image data by capturing the identification code displayed on the screen of the first customer terminal 61 with the camera of the employee terminal 50 may be applied.

In S315, the employee terminal 50 transmits a shared screen request including the identification code and logged-in employee information to the work support server 10. By using the session management server 13 and the user account management server 17, it is checked whether the employee who uses the employee terminal 50 has the necessary authority.

In addition, information necessary for accessing the screen shared by the customer (identification code) may be transmitted to the work sharing server 12 to establish a connection. The work support server 10 compares the token included in the shared screen request of the employee terminal 50 with the token generated in S300 to verify whether the request is valid, and if the two tokens are identical, allows access to the shared screen.

In S320, the work support server 10 accesses the shared screen among the application screens executed in the first customer terminal 61 according to the access information, and transmits the shared screen to the employee terminal 50, so that establishes the interconnection between the first customer terminal 61 and the employee terminal 50 and enables the screen sharing (may include data sharing).

In S325, once the screen sharing is performed, a device sharing process may be additionally performed. The first customer terminal 61 requests sharing of a remote device (e.g., a card issuer) to the work support server 10. The sharing request includes a token, and the work support server 10 may verify the validity of the received token to confirm the requested first customer terminal 61.

In S330, if valid, the work support server 10 transmits a control request for the remote device to the employee terminal 50 connected to the remote device.

In S335, the employee terminal 50 compares the information received through the identification code with the information received from the work support server 10 to check the validity, and if valid, controls the remote device based on a command included in the control request to perform a work that the first customer terminal 61 requested.

In the above, the screen sharing through the first customer terminal 61 possessed by the customer has been mainly described. The second customer terminal 62 owned by the bank may be similarly screen-shared. In case of the second customer terminal 62, in order for the customer to log in, after performing customer authentication by checking the customer's ID card or by using the customer's biometric information (vein, fingerprint, etc.) registered in the bank, the screen sharing for processing works could be made.

In addition, as described above, in another embodiment, the identification code may be generated and output from the employee terminal instead of the customer terminal, and interconnection may be established by capturing it with the customer terminal as well.

FIG. 8 exemplarily illustrates an architecture of a multi-platform application development system according to another embodiment of the present invention.

As described above, the multi-platform application may be an application for performing work support with screen sharing between two devices running on different platforms.

Referring to FIG. 8, each component of the work support server 10 may be included in the execution architecture (device sharing server 11, work sharing server 12, session management server 13, push server 14, etc.) and the operation architecture (monitoring server 15, plug-in management server 16, user account management server 17, update server 18, etc.).

In addition, the work support server 10 may include a build distribution master server 30 included in a development architecture. The build distribution master server 30 manages and controls a build node 31 managing builds of applications provided to developers and service operators and a distribution node 32 performing distribution process.

The build node 31 provides a service for generating an executable file that can be executed on Android, iOS, Windows, Linux, and Kiosk platforms.

The distribution node 32 distributes an application to one or more stores provided by various platforms, such as AppStore, PlayStore, and Microsoft Store.

The above-described work support method with screen sharing may also be implemented in the form of a non-transitory recording medium including instructions executable by a computer, such as an application or program module executed by a computer. Non-transitory computer-readable medium can be any available media that can be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described work support method with screen sharing may be executed by an application (which may include a program included in a platform or operating system by default installed in the terminal) installed by default in the terminal, and by an application (i.e., program) that a user manually installed in the terminal after downloading from an application store server, or an application providing server such as a web server related to the application or service. In this sense, the above-described work support method with screen sharing may be implemented as an application (i.e., program) installed by default in the terminal or manually installed by a user, and may be recorded in the non-transitory computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A work support system with screen sharing, comprising:
   a customer terminal in which a service application is installed and executed;

an employee terminal configured for sharing and displaying a designated area of an execution screen of the service application; and a work support server configured for communicating with the customer terminal and the employee terminal, and supporting a customer work by setting a screen of the customer terminal to be shared in the employee terminal under a specified condition, wherein in the employee terminal, a work area for processing work is additionally displayed in addition to a shared screen on which the screen of the customer terminal is mirrored, wherein when a signature area is selected in the employee terminal during the work processing, a signature input window for receiving the customer's handwritten signature is additionally displayed on the screen of the customer terminal, wherein the handwritten signature input through the signature input window is transmitted to the employee terminal to generate a real-time signed electronic document, wherein the work support server generates a token in response to a token generation request for work sharing from a first terminal, which is one of the customer terminal and the employee terminal, transmits the token to the first terminal, compares a token included in a sharing request from a second terminal, which is remaining one of the customer terminal and the employee terminal, with the token that is transmitted to the first terminal, and allows a screen sharing if the two tokens are identical, wherein the first terminal generates an identification code including the token and an access information to the work support server and outputs the identification code on screen, wherein the second terminal captures the identification code, and generates the sharing request including the identification code and information of an employee who operates the employee terminal.

2. The work support system with screen sharing of claim 1, wherein the work support server is included in an execution architecture, and comprises a work sharing server configured of managing access information of an application user and providing a link function between the work support server and the service applications executed in the customer terminal and the employee terminal.

* * * * *